(12) United States Patent
Brehm

(10) Patent No.: US 8,160,218 B2
(45) Date of Patent: Apr. 17, 2012

(54) EVENT DRIVEN CALL GENERATION

(75) Inventor: Michael James Brehm, Allen, TX (US)

(73) Assignee: Alcatel Lucent, Paris (FR)

( * ) Notice: Subject to any disclaimer, the term of this patent is extended or adjusted under 35 U.S.C. 154(b) by 1359 days.

(21) Appl. No.: 11/534,445

(22) Filed: Sep. 22, 2006

(65) Prior Publication Data

US 2008/0084868 A1   Apr. 10, 2008

(51) Int. Cl.
- *H04M 15/00* (2006.01)
- *H04M 17/00* (2006.01)
- *H04M 3/00* (2006.01)

(52) U.S. Cl. .................. 379/114.14; 379/145; 379/189

(58) Field of Classification Search ............. 379/114.14, 379/127.02, 145, 188, 189; 455/410, 412.02; 370/352

See application file for complete search history.

(56) References Cited

U.S. PATENT DOCUMENTS

| | | | |
|---|---|---|---|
| 5,627,886 A * | 5/1997 | Bowman ...................... | 379/111 |
| 5,706,338 A * | 1/1998 | Relyea et al. ................ | 379/189 |
| 2002/0188712 A1* | 12/2002 | Caslin et al. .................. | 709/223 |
| 2004/0103049 A1* | 5/2004 | Kerr ............................... | 705/35 |

* cited by examiner

*Primary Examiner* — Quoc D Tran

(74) *Attorney, Agent, or Firm* — RG + Associates

(57) ABSTRACT

A system, method, and computer readable medium for event driven call generation, comprises, monitoring a database transaction, detecting a suspect pattern in the monitored database transactions, and generating a telephone call based upon the detected suspect pattern.

20 Claims, 4 Drawing Sheets

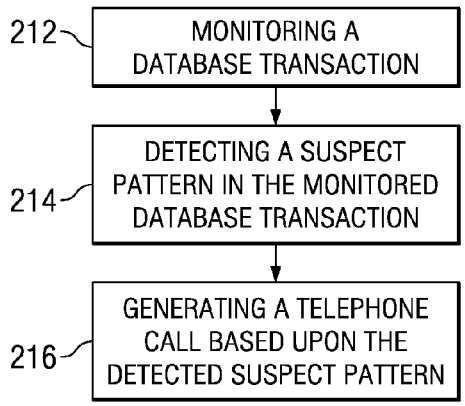
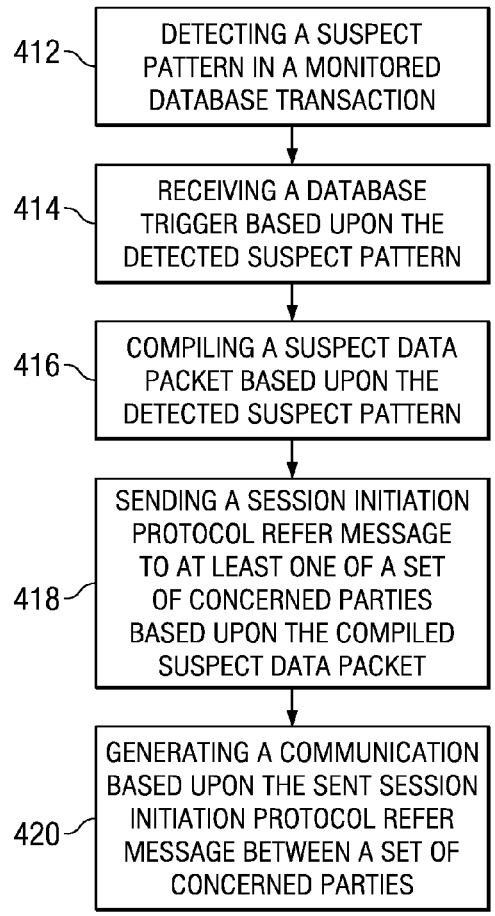
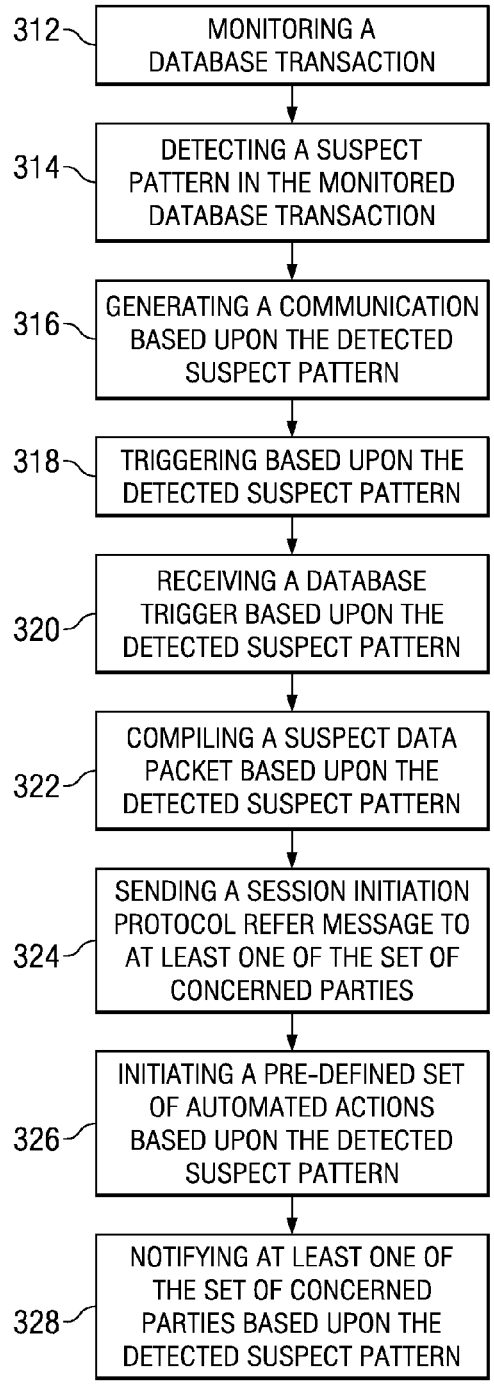

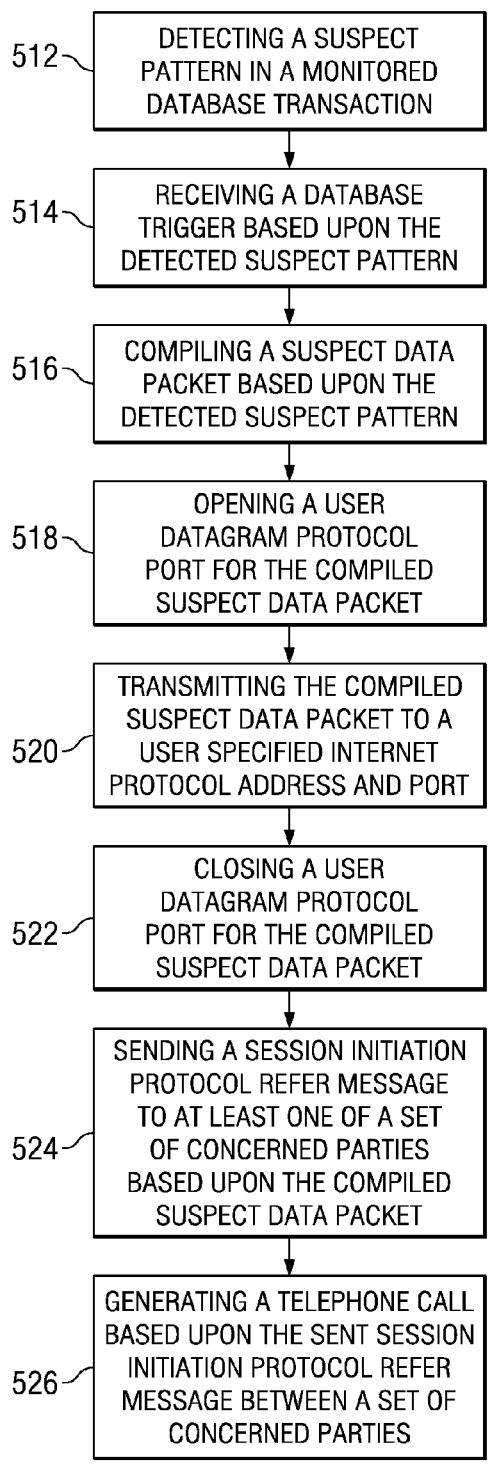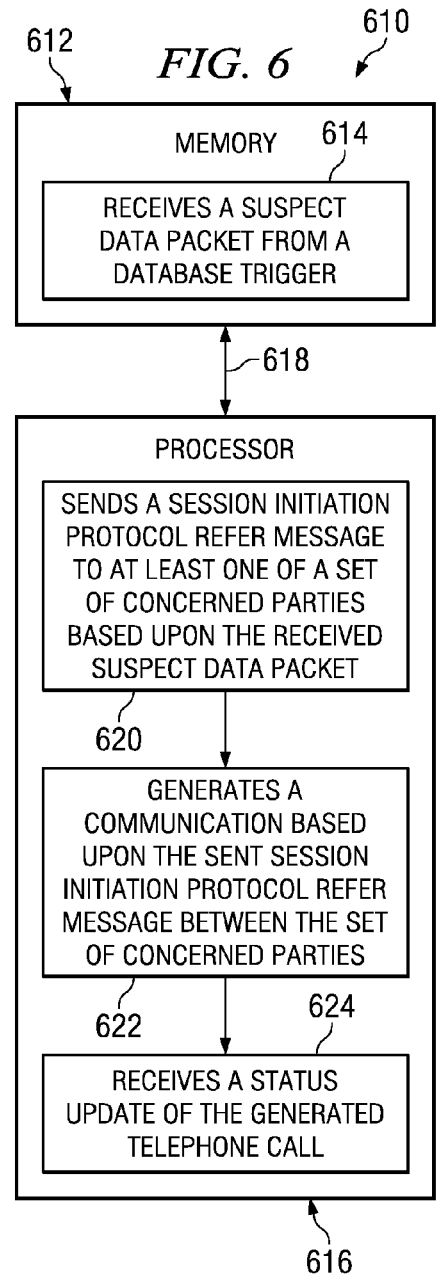

EVENT DRIVEN CALL GENERATION

BACKGROUND OF THE INVENTION

The present invention is generally related to automated call generation and, more specifically to an event driven Session Initiation Protocol (SIP) call generation using database triggers.

In environments with sensitivity to suspect data patterns or flags for action based on data input, it is important to have fast response to incoming data. The specific issue being addressed is how to respond rapidly to an event in a database and establish a session between the concerned parties.

For example, if a financial institution is monitoring for indication of stolen identity or stolen credit cards, it may notice erratic spending behavior. If the financial institution can detect the problem quickly and determine that this is indeed a stolen credit card, they can suspend the card preventing further theft. However, if analysis of the data and/or handoff of this analysis involves human interaction, the window to abuse the stolen credit card increases.

In the case involving human intervention, a monitoring group must be staffed. The monitoring group must then hand off the data to a call center, which increases the time to generate a response to the end user. In the case of a Short Message Service (SMS) message to the end-user, the user must have a cell phone and the cell phone must be advanced enough to handle a messaging service. Also, the user may not know how to respond to the message if the alert indeed shows a suspect transaction.

Therefore, what is needed is an event driven call generation to connect concerned parties. More specifically, what is needed is event driven SIP telephone call generation using database triggers.

SUMMARY OF THE INVENTION

In the present invention an application receives data from a database trigger, compiles the data into HyperText Markup Language (HTML), and send a SIP REFER message to a call center. A SIP REFER message is used to initiate third-party call forwarding in SIP applications.

In the present invention a database trigger is created using, for example, Structured Query Language (SQL) to define the suspect behavior. The trigger could be as simple as a threshold on a transaction amount or complex enough to analyze average spending behavior and find aberrations. The database is enabled to send a message with pertinent user information to the SIP REFER application. One example of the present invention prototype utilizes SQL to create a User Defined Function (UDF) which opened a User Datagram Protocol (UDP) port to send the data packet, and then closed the port.

The SIP REFER application receives the data packet from the database trigger. It compiles the user information into an HTML table for use by the call center. Then, using contact information from the data packet, it sends a SIP REFER message to the call center. The SIP REFER message is used as a third party call control function. If the call center is compliant with RFC 3515, which is the SIP REFER specification, the call center SIP user agent will initiate a SIP session with the user.

The present invention utilizes database triggers to handle transactions as they are processed and uses SIP REFER messages to create a call between the financial institution's call center and the end user.

The advantages of the present invention are rapid notification of the customer and the ability to rapidly take action by an entity's service department, potentially saving both parties time and money. Also, since IP-enabled call centers generally have the ability to contact non-IP-enabled users, the user does not have to be equipped with the latest cell phone technology to benefit from this service. In addition, since the trigger is created in the database, the data does not need to be replicated or bottlenecked to check for aberrant behavior.

The SIP REFER application handles data from the database trigger and sends a SIP REFER message to a defined call center IP and port (which is defined via a configuration file). The application can interpret NOTIFY messages, which informs the agent sending the SIP REFER message of the status of the reference which should be returned by the call center SIP user agent per RFC 3515. These messages relay the status of the connection between the call center and end user. It also delivers an HTML table to the call center, which will relay user information from the database.

The function which actually pushes the data from the database to the SIP REFER application is created, for example, as a UDF. The database trigger can be implemented in SQL as an example of the present invention.

The present invention receives data from the database trigger, compiles the data into HTML, and sends a SIP REFER message to a call center.

In one embodiment of the present invention, a method of event driven call generation comprises, monitoring a database transaction, detecting a suspect pattern in the monitored database transactions, and generating a telephone call based upon the detected suspect pattern between a set of concerned parties. The method may also comprise triggering based upon the detected suspect pattern, receiving a database trigger based upon the detected suspect pattern and compiling a suspect data packet based upon the detected suspect pattern. The method may additionally comprise sending a Session Initiation Protocol REFER message to at least one of the set of concerned parties, initiating a pre-defined set of automated actions based upon the detected suspect pattern and notifying at least one of the set of concerned parties based upon the detected suspect pattern. Wherein the generated telephone call is based upon session initiation protocol, the suspect pattern detection is based upon the database transaction exceeding a predetermined threshold and the suspect pattern detection is based upon observing an atypical database transaction.

In a further embodiment of the present invention, a computer readable medium comprises instructions for, detecting a suspect pattern in a monitored database transaction, receiving a database trigger based upon the detected suspect pattern, compiling a suspect data packet based upon the detected suspect pattern, sending a Session Initiation Protocol REFER message to at least one of a set of concerned parties based upon the compiled suspect data packet, and generating a communication based upon the sent Session Initiation Protocol REFER message between a set of concerned parties. The computer readable medium may also comprise transmitting the compiled suspect data packet to a user specified internet protocol address and port, opening a user datagram protocol port for the compiled suspect data packet and closing a user datagram protocol port for the compiled suspect data packet. Wherein the compiled suspect data packet is placed into a hypertext markup language table and the Session Initiation Protocol REFER message contains user information for at least one of the set of concerned parties.

In yet a further embodiment of the present invention, a system of event driven call generation comprises, a memory receives a suspect data packet from a database trigger, and a processor communicably coupled to the memory, wherein the processor sends a Session Initiation Protocol REFER message to at least one of a set of concerned parties based upon the received suspect data packet, generates a telephone call based upon the sent Session Initiation Protocol REFER message between the set of concerned parties and sends a status update of the generated telephone call. Wherein the processor may also compile the suspect data packet into a hypertext markup language table, initiate a pre-defined set of automated actions based upon the receiving the suspect data packet and transmit the received suspect data packet to a user specified internet protocol address and port.

BRIEF DESCRIPTION OF THE DRAWINGS

FIG. 2 illustrates a first method flow diagram listing the steps of operation of an embodiment of the present invention;

FIG. 3 illustrates a second method flow diagram listing the steps of operation of an embodiment of the present invention;

FIG. 4 illustrates a first software flow diagram of event driven telephone call generation in accordance with an embodiment of the present invention;

FIG. 5 illustrates a second software flow diagram of event driven telephone call generation in accordance with an embodiment of the present invention;

FIG. 6 illustrates a first system of event driven telephone call generation in accordance with an embodiment of the present invention.

DETAILED DESCRIPTION OF THE INVENTION

Figure 1:
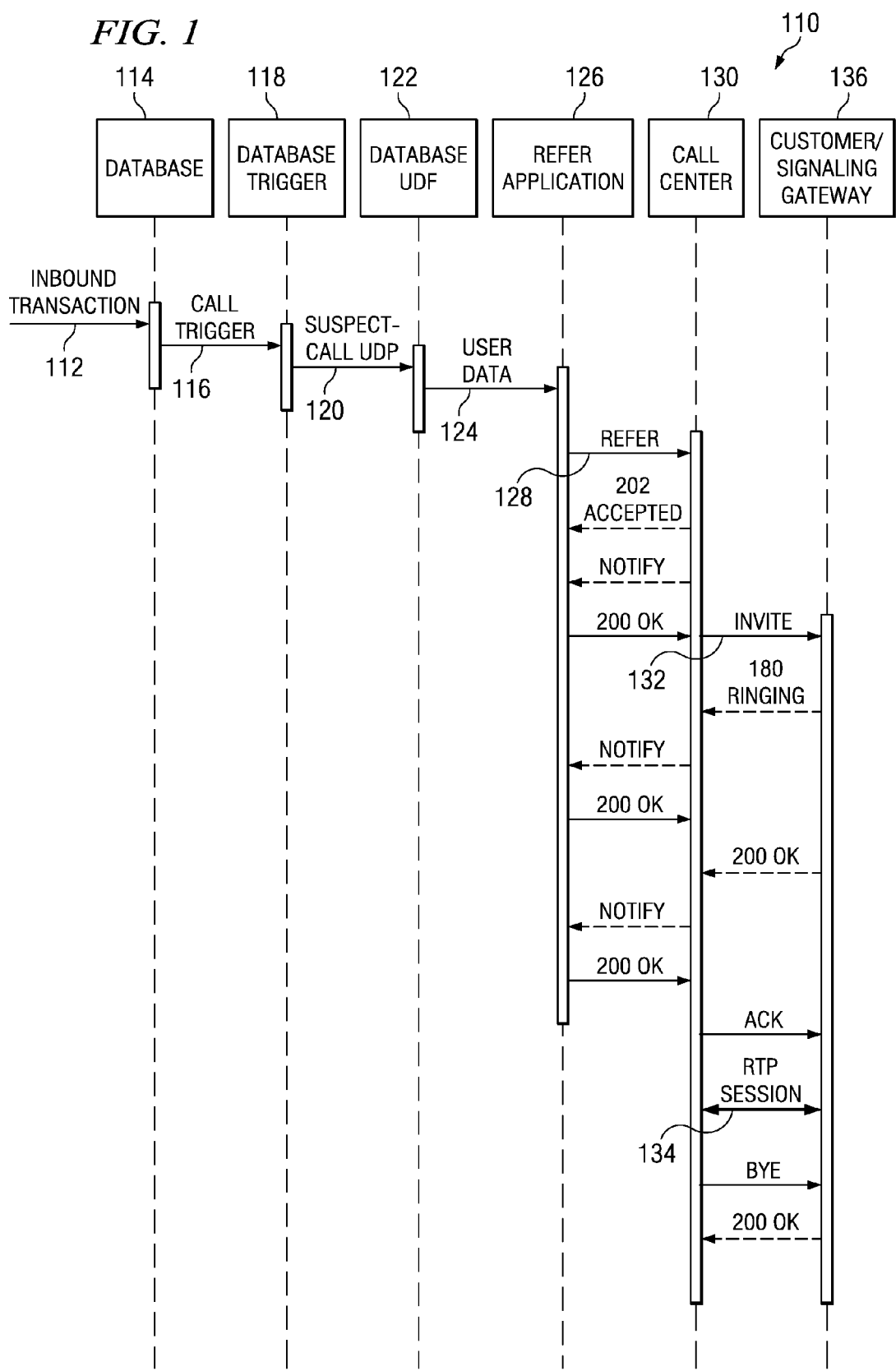
FIG. 1 illustrates a data and call flow for a suspect data pattern that includes an embodiment of the present invention as a portion thereof.

Referring now to FIG. 1, a data and call flow 110 is depicted for a suspect data pattern. The incoming transmission 112 is inbound to the database 114. During database processing, the transaction exceeds a threshold 116 in the database trigger 118. The suspect data pattern 120 is implemented as a user defined function 122. The user data 124 is sent to the REFER application 126 and is used to create a REFER message 128 which is sent to a call center 130. The call center then uses the information in the REFER message 132 to initiate a telephone call 134 with the customer 136.

Referring now to FIG. 2, a first method of event driven call generation 210 is depicted and comprises a number of blocks or modules that are software, hardware, or firmware, and/or the combination of software, hardware, and/or firmware. The method comprises, monitoring 212 a database transaction, detecting 214 a suspect pattern in the monitored database transactions, and generating 216 a telephone call based upon the detected suspect pattern. Such a call can generated between a set of concerned parties. The transfer of information between the modules occurs via at least one of: a wireless protocol, a wired protocol and a combination of the wireless protocol and the wired protocol.

Referring now to FIG. 3, a second method of event driven call generation 310 is depicted and comprises a number of blocks or modules that are software, hardware, or firmware, and/or the combination of software, hardware, and/or firmware. The method comprises monitoring 312 a database transaction, detecting 314 a suspect pattern in the monitored database transactions, and generating 316 a communication (for example, a telephone call, a voice mail, an email, an instant message, and the like) based upon the detected suspect pattern. Such a call can generated between a set of concerned parties. The method may also comprise triggering 318 based upon the detected suspect pattern, receiving 320 a database trigger based upon the detected suspect pattern and compiling 322 a suspect data packet based upon the detected suspect pattern. The method may additionally comprise sending 324 a Session Initiation Protocol REFER message to at least one of the set of concerned parties, initiating 326 a pre-defined set of automated actions based upon the detected suspect pattern and notifying 328 at least one of the set of concerned parties based upon the detected suspect pattern, wherein the generated telephone call is based upon session initiation protocol, the suspect pattern detection is based upon the database transaction exceeding a predetermined threshold and the suspect pattern detection is based upon observing an atypical database transaction. The transfer of information between the modules occurs via at least one of: a wireless protocol, a wired protocol and a combination of the wireless protocol and the wired protocol.

Referring now to FIG. 4, a first software flow block 410 of event driven call generation is depicted. The software, or computer readable medium comprises instructions for detecting 412 a suspect pattern in a monitored database transaction, receiving 414 a database trigger based upon the detected suspect pattern and compiling 416 a suspect data packet based upon the detected suspect pattern. The computer readable medium also comprises instructions for sending 418 a Session Initiation Protocol REFER message to at least one of a set of concerned parties based upon the compiled suspect data packet, and generating 420 a communication (for example, a telephone call, a voice mail, an email, an instant message, and the like) based upon the sent Session Initiation Protocol REFER message between a set of concerned parties. These steps may also be embodied in firmware and/or hardware. The transfer of information occurs via at least one of a wireless protocol, a wired protocol and the combination of the wireless protocol and the wired protocol.

Referring now to FIG. 5, a second software flow block 510 of event driven call generation is depicted. The software, or computer readable medium comprises instructions for, detecting 512 a suspect pattern in a monitored database transaction, receiving 514 a database trigger based upon the detected suspect pattern, compiling 516 a suspect data packet based upon the detected suspect pattern. The computer readable medium may also comprise instructions for opening 518 a user datagram protocol port for the compiled suspect data packet, transmitting 520 the compiled suspect data packet to a user specified internet protocol address and port and closing 522 a user datagram protocol port for the compiled suspect data packet. The computer readable medium may also comprise sending 524 a Session Initiation Protocol REFER message to at least one of a set of concerned parties based upon the compiled suspect data packet, and generating 526 a telephone call based upon the sent Session Initiation Protocol REFER message between a set of concerned parties. Wherein the compiled suspect data packet is placed into a hypertext markup language table and the Session Initiation Protocol REFER message contains user information for at least one of the set of concerned parties. These steps may also be embodied in firmware and/or hardware. The transfer of information between the repository and the monitor occurs via at least one of a wireless protocol, a wired protocol and the combination of the wireless protocol and the wired protocol.

Referring now to FIG. 6, a first system 610 of event driven call generation is depicted. The system comprises a memory 612 that receives 614 a suspect data packet from a database trigger, and a processor 616 communicably coupled 618 to the memory. The processor sends 620 a Session Initiation Protocol REFER message to at least one of a set of concerned parties based upon the received suspect data packet, generates 622 a communication based upon the sent Session Initiation Protocol REFER message between the set of concerned parties and receives 624 a status update of the generated telephone call. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 7:
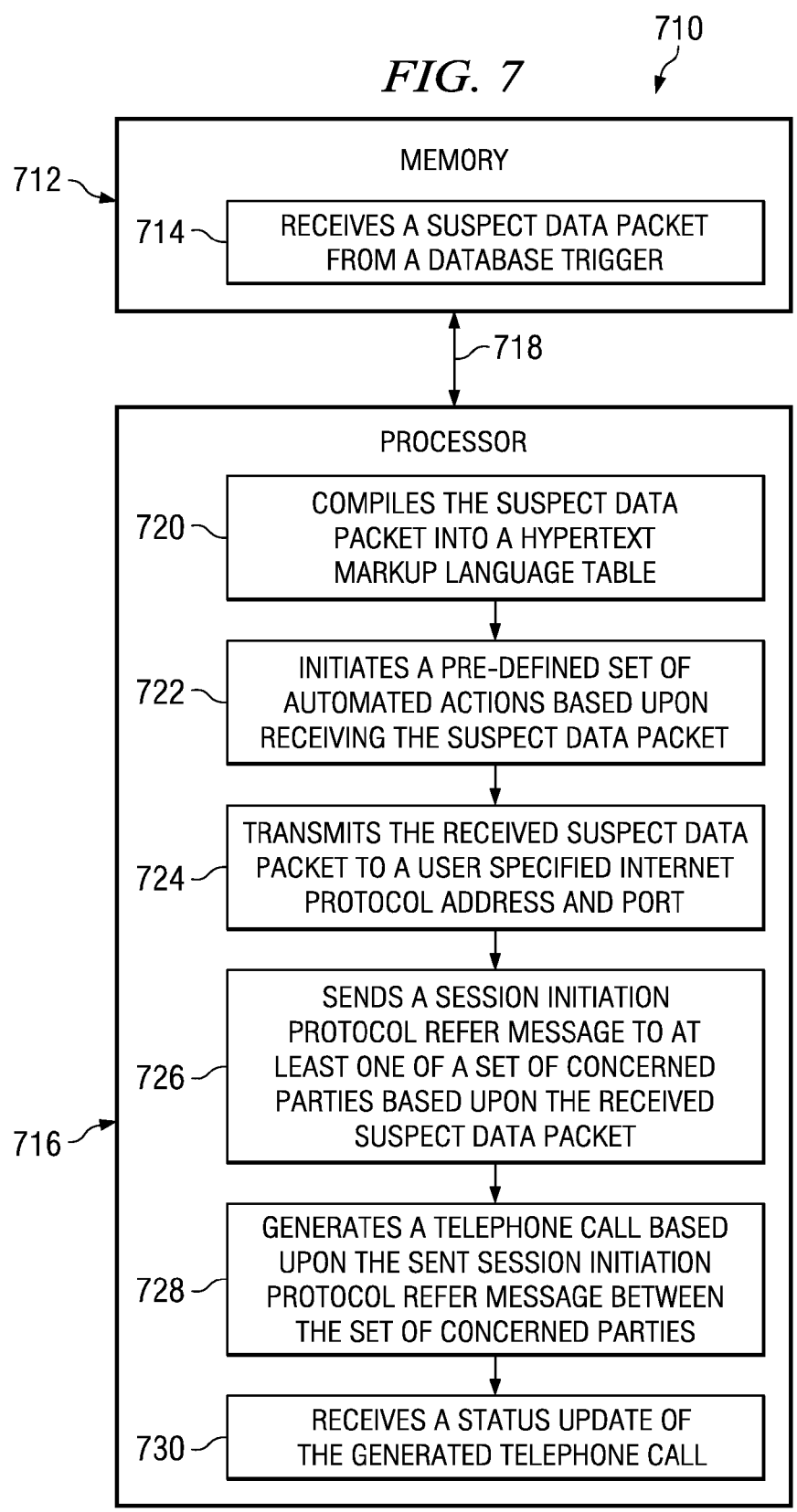
FIG. 7 illustrates a second system of event driven telephone call generation in accordance with an embodiment of the present invention.

Referring now to FIG. 7, a second system 710 of event driven call generation is depicted. The system comprises a memory 712 that receives 714 a suspect data packet from a database trigger, and a processor 716 communicably coupled 718 to the memory. The processor compiles 720 the suspect data packet into a hypertext markup language table, initiates 722 a pre-defined set of automated actions based upon the receiving the suspect data packet and transmits 724 the received suspect data packet to a user specified internet protocol address and port. The processor may also send 726 a Session Initiation Protocol REFER message to at least one of a set of concerned parties based upon the received suspect data packet, generate 728 a telephone call based upon the sent Session Initiation Protocol REFER message between the set of concerned parties and receive 730 a status update of the generated telephone call. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols. For example, the data transmitted via hypertext markup language could also be compiled in extensible markup language.

What is claimed is:

1. A method for event driven call generation, comprising:
    monitoring a database transaction being performed on the database;
    detecting a suspect pattern in the monitored database transaction, the suspect pattern being observed from an inbound access transaction to the database;
    triggering a database trigger to perform a communication transmission based on the detected suspect pattern; and
    generating a telephone call based upon the detected suspect pattern.

2. The method of claim 1 wherein:
    the generated telephone call is based upon a Session Initiation Protocol.

3. The method of claim 1 comprising:
    triggering based upon the detected suspect pattern.

4. The method of claim 1 comprising:
    receiving a database trigger based upon the detected suspect pattern.

5. The method of claim 1 comprising:
    compiling a suspect data packet based upon the detected suspect pattern.

6. The method of claim 1 comprising:
    sending a Session Initiation Protocol REFER message to at least one party affected by the detected suspect pattern.

7. The method of claim 1 comprising:
    initiating a pre-defined set of automated actions based upon the detected suspect pattern.

8. The method of claim 1 comprising:
    notifying at least one party affected by the detected suspect pattern based upon the detected suspect pattern.

9. The method of claim 1 wherein:
    the suspect pattern detection is based upon the database transaction exceeding a predetermined threshold.

10. The method of claim 1 wherein:
    the suspect pattern detection is based upon observing an atypical database transaction.

11. A non-transitory computer readable storage medium comprising instructions that when executed cause a processor perform:
    detecting a suspect pattern in a monitored database transaction performed on the database, the suspect pattern being observed from an inbound access transaction to the database;
    triggering a database trigger to perform a communication transmission based on the detected suspect pattern;
    receiving the database trigger based upon the detected suspect pattern;
    compiling a suspect data packet based upon the detected suspect pattern;
    sending a Session Initiation Protocol REFER message to at least one party affected by the detected suspect pattern based upon the compiled suspect data packet; and
    generating a communication based upon the sent Session Initiation Protocol REFER message between the at least one party and another party.

12. The non-transitory computer readable storage medium of claim 11 comprising:
    transmitting the compiled suspect data packet to a user specified interne protocol address and port.

13. The non-transitory computer readable storage medium of claim 11 wherein:
    the compiled suspect data packet is placed into a hypertext markup language table.

14. The non-transitory computer readable storage medium of claim 11 wherein:
    the Session Initiation Protocol REFER message contains user information for at least one of the parties.

15. The non-transitory computer readable storage medium of claim 11 comprising:
    opening a user datagram protocol port for the compiled suspect data packet.

16. The non-transitory computer readable storage medium of claim 15 comprising:

closing a user datagram protocol port for the compiled suspect data packet.

17. A system for event driven call generation, comprising:
a memory that configured to receive a suspect data packet from a database trigger; and
a processor communicably coupled to the memory, the processor configured to
detect a suspect pattern in a monitored database transaction performed on a database, the suspect pattern being observed from an inbound access transaction to the database;
trigger the database trigger to perform a communication transmission based on the detected suspect pattern,
send a Session Initiation Protocol REFER message to at least one of a set of parties based upon the received suspect data packet, and
generate a communication based upon the sent Session Initiation Protocol REFER message between the set of parties, and
a receiver configured to receive a status update of the generated telephone call.

18. The system of claim 17 wherein the processor compiles the suspect data packet into a hypertext markup language table.

19. The system of claim 17 wherein the processor initiates a pre-defined set of automated actions based upon receiving the suspect data packet.

20. The system of claim 17 wherein the processor transmits the received suspect data packet to a user specified internet protocol address and port.

* * * * *